United States Patent
Brost

(10) Patent No.: US 9,912,822 B2
(45) Date of Patent: Mar. 6, 2018

(54) OPERATING A POWER SUPPLY CIRCUIT OF A COMMUNICATIONS DEVICE

(71) Applicant: ARRIS Enterprises LLC, Suwanee, GA (US)

(72) Inventor: Andrew Carl Brost, Cool, CA (US)

(73) Assignee: ARRIS Enterprise LLC, Suwanee, GA (US)

( * ) Notice: Subject to any disclaimer, the term of this patent is extended or adjusted under 35 U.S.C. 154(b) by 0 days.

(21) Appl. No.: 15/087,985

(22) Filed: Mar. 31, 2016

(65) Prior Publication Data
US 2016/0295029 A1    Oct. 6, 2016

Related U.S. Application Data

(60) Provisional application No. 62/141,589, filed on Apr. 1, 2015.

(51) Int. Cl.
| H04M 3/00 | (2006.01) |
| H04M 19/08 | (2006.01) |
| H04L 12/10 | (2006.01) |
| H04M 11/06 | (2006.01) |

(52) U.S. Cl.
CPC ............ H04M 19/08 (2013.01); H04L 12/10 (2013.01); H04M 11/062 (2013.01)

(58) Field of Classification Search
USPC ...................................................... 379/395.01
See application file for complete search history.

(56) References Cited

U.S. PATENT DOCUMENTS

| 6,956,943 | B1* | 10/2005 | Goodrich, II | H04M 3/005 379/395.01 |
| 8,139,720 | B2* | 3/2012 | Patel | H04J 3/0688 379/26.01 |
| 2005/0147237 | A1* | 7/2005 | Mills | H04M 19/08 379/413 |
| 2007/0127713 | A1* | 6/2007 | Schley-May | H04M 1/24 379/413.02 |
| 2007/0201671 | A1* | 8/2007 | Tollerson | H04M 19/08 379/242 |

* cited by examiner

*Primary Examiner* — Maria El-Zoobi
(74) *Attorney, Agent, or Firm* — Thomas A. Ward

(57) ABSTRACT

A method for operating a power supply circuit of a communications device involves operating the power supply circuit in a first operating mode in which a switching frequency of the power supply circuit is higher than an operating frequency band of the communications device and switching the power supply circuit to operate in a second operating mode in response to connecting the power supply circuit to a battery by decreasing the switching frequency of the power supply circuit.

16 Claims, 5 Drawing Sheets

OPERATING A POWER SUPPLY CIRCUIT OF A COMMUNICATIONS DEVICE

PRIORITY CLAIM

This Application claims priority under 35 U.S.C. § 119(e) from earlier filed U.S. Provisional Application Ser. No. 62/141,589, filed Apr. 1, 2015, which is hereby incorporated by reference.

BACKGROUND

Communications devices can be used to transmit outgoing signals to another communications device and/or to receive incoming signals from another communications device. For example, digital subscriber line (DSL) devices (e.g., a DSL modem) can be used to transmit outgoing DSL signals to other communications devices and/or to receive incoming DSL signals over electrical wires such as copper telephone lines. At increased cost and improved efficiency, conventional direct current (DC) step-down Buck regulators used in DSL devices typically operate at a frequency that is within the DSL data modulation frequencies. However, operating a power supply of a DSL device at these switching frequencies can reduce the quiet line noise (QLN) performance levels.

To reduce interference with the operation of a communications device, the switching frequency of a switched mode power supply of the communications device is set to be higher than the data modulation frequencies of the communications device. For example, to reduce interference with the operation of a DSL device, the switching frequency of a switched mode power supply of the DSL device can be set to be higher than the DSL operating band. However, a power supply circuit, such as a Buck regulator, will typically require a larger voltage head-room to operate at the higher switching frequency. When a power supply circuit is switched to a battery back-up, the voltage head-room is more limited compared to a power outlet that can supply an unlimited amount of power. For example, for a residential gateway that includes a battery backed-up, the minimum voltage head-room may not be adequately maintained as the battery is depleted.

SUMMARY

Embodiments of a system and method for operating a power supply circuit of a communications device are described. In one embodiment, a method for operating a power supply circuit of a communications device involves operating the power supply circuit in a first operating mode in which a switching frequency of the power supply circuit is higher than an operating frequency band of the communications device and switching the power supply circuit to operate in a second operating mode in response to connecting the power supply circuit to a battery by decreasing the switching frequency of the power supply circuit. By decreasing the switching frequency of the power supply circuit when the communications device is switched to battery power, the power supply circuit can be used in applications where it is not feasible for the power supply circuit to operate at such a high switching frequency. For example, the power supply circuit can be used in an application in which the depletion of a backup battery prevents the power supply circuit from operating at such a high switching frequency. Additionally, because the switching frequency of the power supply circuit is decreased, the efficiency of the power supply circuit can be improved. Other embodiments are also described.

In one embodiment, a system for operating a power supply circuit of a communications device includes an operating mode controller configured to operate the power supply circuit in a first operating mode in which a switching frequency of the power supply circuit is higher than an operating frequency band of the communications device and switch the power supply circuit to operate in a second operating mode in response to connecting the power supply circuit to a battery by decreasing the switching frequency of the power supply circuit.

In one embodiment, a method for operating a power supply circuit for a DSL device involves operating the power supply circuit in a first operating mode in which a switching frequency of the power supply circuit is higher than a data modulation frequency band of the DSL device and switching the power supply circuit to operate in a second operating mode in response to connecting the power supply circuit to a battery or in response to the DSL device being in a training mode with a DSL controller device by decreasing the switching frequency of the power supply circuit to be within or lower than the data modulation frequency band of the DSL device.

Other aspects and advantages of embodiments of the disclosed techniques will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The disclosed embodiments may be embodied in other specific forms without departing from its spirit or essential characteristics. The described embodiments are to be considered in all respects only as illustrative and not restrictive. The scope of the embodiments are, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the embodiments described should be or are in any single embodiment. Rather, language referring to the features and advantages is understood to mean that a specific feature, advantage, or characteristic described in connection with an embodiment is included in at least one embodiment relevant to this disclosure. Thus, discussions of the features and advantages, and similar language, throughout this specification may, but do not necessarily, refer to the same embodiment.

Furthermore, the described features, advantages, and characteristics of embodiments described herein may be combined in any suitable manner in one or more embodiments. One skilled in the relevant art will recognize, in light of the description herein, that embodiments disclosed can be practiced without one or more of the specific features or advantages of a particular embodiment. In other instances, additional features and advantages may be recognized in certain embodiments that may not be present in all embodiments disclosed herein.

Reference throughout this specification to "one embodiment," "an embodiment," or similar language means that a particular feature, structure, or characteristic described in connection with the indicated embodiment is included in at least one embodiment disclosed herein. Thus, the phrases "in one embodiment," "in an embodiment," and similar language throughout this specification may, but do not necessarily, all refer to the same embodiment.

Figure 1:
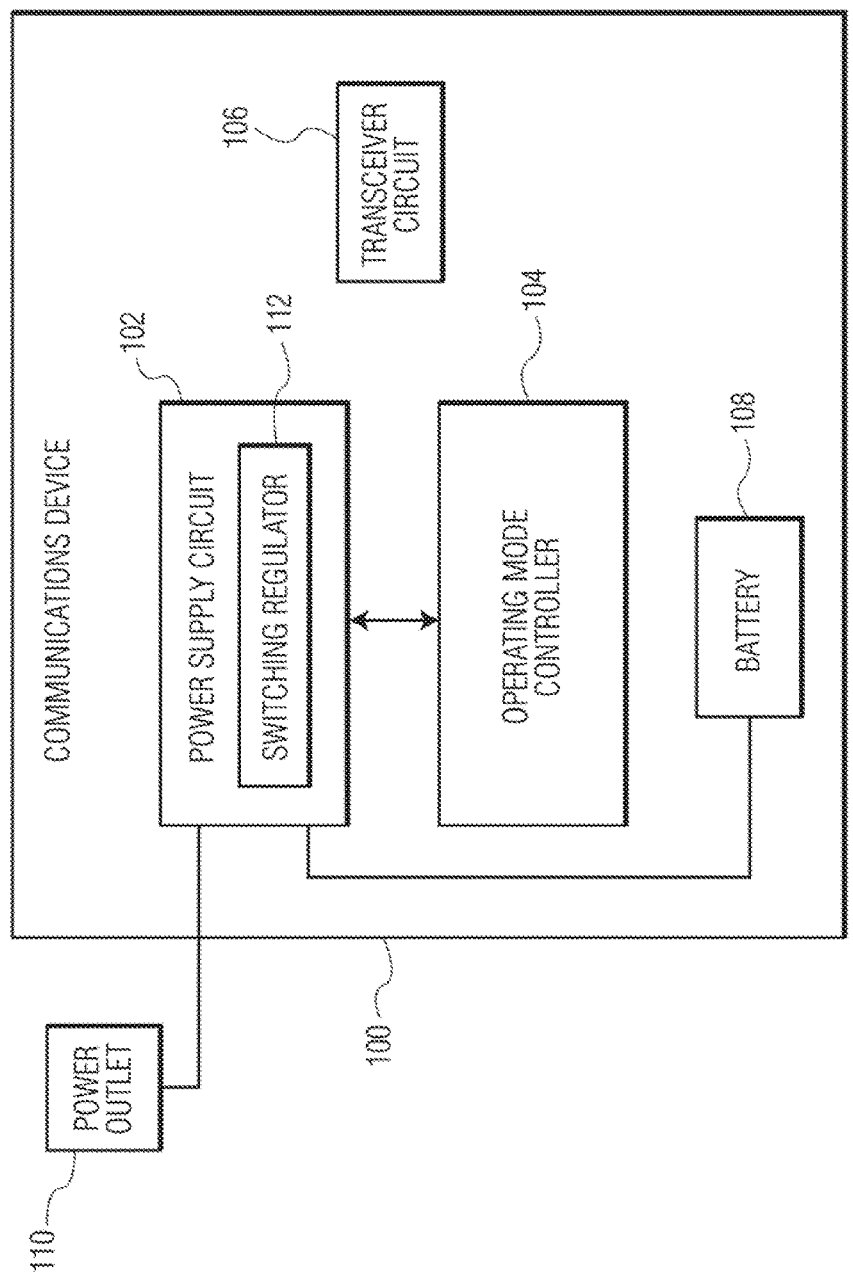
FIG. 1 depicts a schematic diagram of one embodiment of a communications device.

FIG. 1 depicts a schematic diagram of one embodiment of a communications device 100. In the embodiment depicted in FIG. 1, the communications device includes a power supply circuit 102, an operating mode controller 104, a transceiver circuit 106 and a battery 108. The communications device may be any type of communications device. In some embodiments, the communications device is a DSL device. For example, the communications device is a DSL modem or a DSL residential gateway. In an embodiment, the communications device is an asymmetric digital subscriber line (ADSL) device that can be used to communicate with another ADSL communications device over copper telephone lines. Although the communications device is shown in FIG. 1 as including the power supply circuit, the operating mode controller, the transceiver circuit, and the battery, in other embodiments, the communications device may include one or more additional circuit elements. For example, the communications device may include a switch device to switch the power supply circuit between different power sources (e.g., a power outlet 110 (e.g., an on-wall power outlet) and the battery). In addition, although the communications device is shown in FIG. 1 as including the battery, in other embodiments, the battery is separate from the communications device.

In one embodiment, the power supply circuit 102 is configured to provide power to the transceiver circuit 106 as well as other circuits within the communications device 100. The power supply circuit may be a voltage converter such as a Buck regulator that converts an input voltage into an output voltage that is lower than the input voltage, a Boost regulator that converts an input voltage into an output voltage that is higher than the input voltage, or a Buck/Boost regulator that converts an input voltage into an output voltage that is lower or higher than the input voltage. In the embodiment depicted in FIG. 1, the power supply circuit can receive power from the power outlet 110 (e.g., an on-wall power outlet) and the battery 108. In some embodiments, the power supply circuit receives power from one power source exclusively during a certain time period. For example, the power supply circuit receives power from a power outlet that can supply an unlimited amount of power during a first time period and can receive power from the battery during a second time period. In some embodiments, the power supply circuit is a switched mode power supply that includes a switching regulator 112 that operates to convert an input voltage to an output voltage by switching the current running through an inductor at a switching frequency. The switching regulator may include circuit elements such as inductors, switches, and/or capacitors. For example, the switching regulator may include an inductor and switches (e.g., transistors) that are alternately switched on and off at a switching frequency to charge the inductor when one switch is switched on (conducting) and another switch alternately turns on (while the first switch turns off) to allow the inductor to discharge so as to drive a load, utilizing the magnetic energy stored in the inductor to complete a switch mode power conversion cycle. For example, for a Buck regulator, a high side transistor is turned on, which provide current to flow into an inductor. During the continuing Buck cycle, the switch node (driven end) inductance creates a counter apposing voltage to maintain the inductor current. This negative end is then connected to ground. As the inductor magnetic field collapses, the other end of the inductor continues to source current onto the output capacitor to complete the Buck cycle.

Compared to a power supply circuit that constantly operates at a frequency that is lower than or within the data modulation frequencies of a communications device, the power supply circuit 102 can operate at a switching frequency that is higher than the data modulation frequencies of the communications device 100. Consequently, interference with the communications device that is caused by the power supply circuit can be reduced. In addition, compared to a power supply circuit that constantly operates at a switching frequency that is higher than the DSL switching frequency band, the power supply circuit 102 can be operated at a switching frequency that is lower than or within the DSL switching frequency band with DSL interference. Consequently, the power supply circuit can be used in applications where it is not feasible for the power supply circuit to operate at such a high switching frequency. For example, the power supply circuit can be used in an application in which the depletion of a backup battery prevents the power supply circuit from operating at such a high switching frequency. Additionally, because the power supply circuit can be operated at a switching frequency that is lower than or within the DSL switching frequency band, the efficiency of the power supply circuit can be improved.

In one embodiment, the operating mode controller 104 is configured to control the operation of the power supply circuit 102 by determining an operating mode for the power supply circuit. The operating mode controller may select an operating mode for the power supply circuit from a set of pre-defined operating modes. In some embodiments, the operating mode controller causes the power supply circuit to operate at a different switching frequency in each of the operating modes. The operating mode controller can be implemented in software stored in a non-transitory computer readable medium (e.g., memory or cache), hardware (e.g., a processor), firmware, or a combination of software, hardware, and/or firmware. In an embodiment, the operating mode controller is implemented as a microcontroller.

The operating mode controller 104 may selectively decide when to switch the power supply circuit 102 from one operating mode to another operating mode based on one or more factors. Examples of the factors may include the type of the power source that supplies power to the power supply circuit, an operating characteristic (e.g., a voltage) of the power source that supplies power to the power supply circuit, and whether or not the communications device is in a training mode with a communications controller device. The operating mode controller may adapt the switching frequency of the power supply circuit according to the type of the power source that supplies power to the power supply circuit. In some embodiments, the operating mode controller does not switch the power supply circuit from one operating mode to another operating mode until the voltage of the battery 108 is below a threshold voltage. In an embodiment, the operating mode controller switches the power supply circuit to a low switching frequency operating mode if a measured headroom of the voltage of the battery is close to a threshold, e.g., to retain worst case power supply operating conditions. In an embodiment, the operating mode controller does not switch the power supply circuit to a low switching frequency operating mode if the voltage of the battery is higher than a threshold, e.g., to utilize the input voltage headroom of the power supply circuit to maintain the lowest DSL QLN performance. Generally, the high frequency mode offers lowest communication channel interference but with less power supply efficiency, and a low switching frequency mode increases DSL interference but offers higher power supply switching efficiency. In some embodiments, the operating mode controller switches the power supply circuit from one operating mode to another operating mode after the transceiver circuit communicates with a communications controller device, such as a digital subscriber line access multiplexer (DSLAM), to request line retraining.

For example, an operating mode controller of a residential gateway can selectively decide when to switch the gateway's power supply circuit from one operating mode to another operating mode. The residential gateway may cause the power supply circuit to switch from one operating mode to another operating mode in response to the voltage of the battery measuring below a minimum threshold value. The residential gateway may cause the power supply circuit to switch from one operating mode to another operating mode in response to the measured voltage headroom of the power supply circuit reaching a critical point, to retain a maximum channel capacity for as long as possible. In another example, the residential gateway may cause the power supply circuit to switch from one operating mode to another operating mode in response to communication of a message to the DSLAM requesting line retraining, to compensate for increased interference.

In an embodiment, the operating mode controller 104 is configured to operate the power supply circuit in a first operating mode in which a switching frequency of the power supply circuit is higher than an operating frequency band of the communications device. In this embodiment, the operating mode controller is configured to switch the power supply circuit to operate in a second operating mode in response to connecting the power supply circuit to the battery 108 by decreasing the switching frequency of the power supply circuit. The operating mode controller can be implemented in software, hardware, firmware, or a combination of software, hardware, and/or firmware. In an embodiment, the operating mode controller is implemented as a microcontroller.

In one embodiment, the transceiver circuit 106 is configured to transmit outgoing signals to another communications device and/or to receive incoming signals from another communications device. In an embodiment, the transceiver circuit is a DSL transceiver circuit that is configured to transmit outgoing DSL signals to a DSLAM and/or to receive incoming DSL signals from a DSLAM over electrical wires such as copper telephone lines. For example, the transceiver circuit may be an ADSL transceiver that communicates with another ADSL communications device over copper telephone lines.

Figure 2:
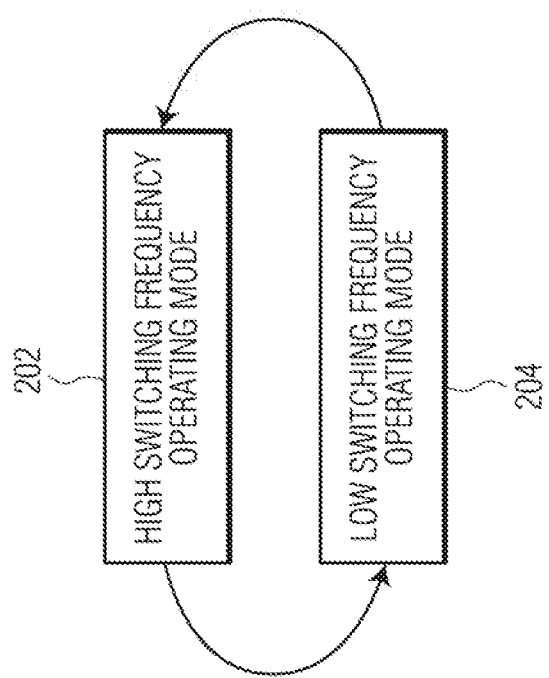
FIG. 2 depicts a state diagram for a power supply circuit of the communications device depicted in FIG. 1.

FIG. 2 depicts a state diagram for the power supply circuit 102. In the embodiment depicted in FIG. 2, the power supply circuit can operate in a high switching frequency operating mode 202 or in a low switching frequency operating mode 204. In one embodiment, the operating mode controller 104 causes the power supply circuit to operate at the high switching frequency operating mode in which the switching frequency of the power supply circuit is higher than the data modulation frequency band of the communications device 100. By operating the power supply circuit at a switching frequency that is higher than the data modulation frequency band of the communications device, interference with the operation of the transceiver circuit 106 by the power supply circuit can be reduced. For example, in the high switching frequency operating mode, the power supply circuit receives power from the power outlet (e.g., in Utility Mode), which allows adequate voltage head-room to operate the power supply circuit 102 at a higher switching frequency. In an embodiment, the operating mode controller sets the switching frequency of the power supply circuit to be higher than the data modulation frequency band of the communications device such that the power supply circuit does not constitute an aggressor on the DSL quiet line noise (QLN).

In some embodiments, the operating mode controller 104 switches the power supply circuit 102 to operate in the low switching frequency operating mode 204 in response to connecting the power supply circuit to the battery 108 (e.g., in Battery Mode) by decreasing the switching frequency of the power supply circuit. When the power supply circuit is switched from the power outlet 110 to the battery 108, the voltage head-room of the power supply circuit 102 is more limited. For example, the minimum voltage head-room may not be adequately maintained as the battery is depleted. Consequently, reducing the switching frequency of the power supply circuit when the power supply circuit is switched to the battery allows the power supply circuit to continuously provide power to the DSL transceiver circuit and improves the efficiency (to extend battery discharge time) of the power supply circuit. Moreover, the disclosed techniques for adaptable switching frequencies associated with a utility vs. battery operating mode enables a more efficient use of Buck regulators over an extended range of operating modes, where conventional techniques limit the efficiency of the Buck regulators over different operating modes or would require adding costly shielded inductors to obtain target QLN performance with a lower switching frequency.

Figure 3:
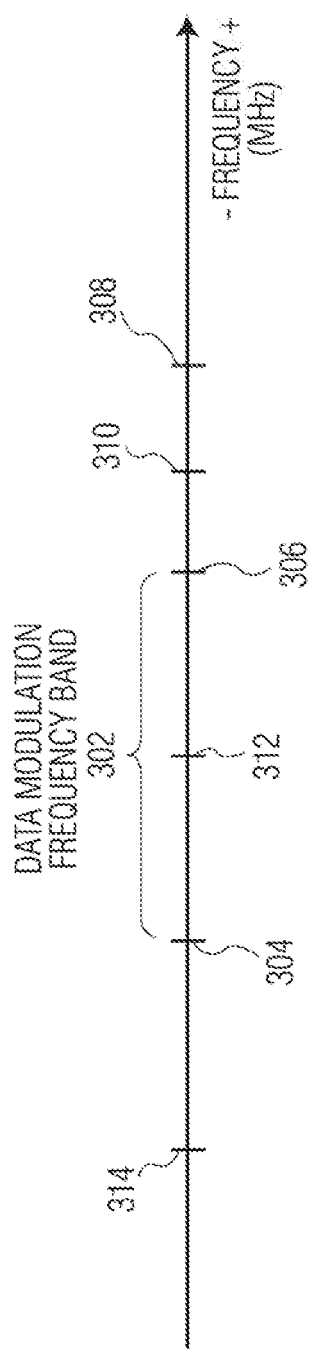
FIG. 3 depicts a switching frequency allocation diagram for the power supply circuit of the communications device depicted in FIG. 1.

FIG. 3 depicts a switching frequency allocation diagram for the power supply circuit 102 of the communications device 100 depicted in FIG. 1. In the embodiment depicted in FIG. 3, the communications device has a data modulation frequency band 302, which is located between frequency points 304, 306. In an embodiment, the data modulation frequency band is the frequency range at which data is modulated by the transceiver circuit 106 onto the communications medium (e.g., copper telephone lines). A downstream bandwidth may be allocated for such modulation that is specific to desired performance levels in the communications device. For example, the communications device may be an ADSL device that modulates data signals between 0.14 megahertz (MHz) and 2.2 MHz.

For purposes of increased cost and improved efficiency, conventional direct current (DC) step-down Buck regulators used in DSL devices typically operate at a frequency that is within the DSL data modulation frequencies. For example, conventional DC step-down Buck regulators will operate with a 1 MHz switching frequency when the communications device is allocated a downstream bandwidth of 0.14 MHz to 2.2 MHz. However, such conventional switching frequencies may be aggressors in the encompassing frequency band of the communications device that has been allocated for quiet line noise (QLM) performance levels. Thus, conventional switching frequencies selected within the allocated frequency band may undesirably reduce the QLN performance levels. Alternately, operating a power supply of a DSL device at a higher switching frequency, such as one that exceeds the frequency band of the communications device, can reduce the impact to the quiet line noise (QLN) performance levels. For example, a Buck switching regulator may operate above 2.2 MHz, where the frequency band allocated to the communications device is between 0.14 MHz to 2.2 MHz, as described in the above example. However, to operate outside the communications device's frequency band, the Buck regulator requires sufficient voltage headroom to operate at the higher frequency.

In an example of the operation of the communications device 100, power is initially supplied to the power supply circuit 102 by the power outlet 110 and the operating mode controller 104 causes the power supply circuit 102 to operate in the high switching frequency operating mode 202 in which the switching frequency of the power supply circuit is at a frequency point 308, which is higher than the data modulation frequency band 302 of the communications device. For example, the switching frequency of the power supply circuit is set at a frequency that is higher over 2.2 MHz when the data modulation frequency band of the communications device is between 0.14 MHz and 2.2 MHz.

After the power supply circuit switches to the battery 108 (i.e., power is supplied to the power supply circuit exclusively by the battery), the minimum Buck voltage headroom needed to maintain the higher switching frequency may not be adequately maintained. The problem may increase as the battery depletes. Merely switching the regulator to a lower frequency causes interference, e.g., noise, on the line, reducing the QLN performance. Because operations may be critical at the battery's end of life, e.g., voice over IP for emergency calls, it is desirable to minimize interference on the line and minimize the impact to the desired QLN performance levels.

As disclosed herein, after the power supply circuit switches to the battery 108 the operating mode controller can switch the power supply circuit to operate in the low switching frequency operating mode 204 by decreasing the switching frequency of the power supply circuit. For example, the operating mode controller decreases the switching frequency of the power supply circuit from the frequency point 308 to a frequency point 310, 312, or 314. The operating mode controller may decrease the switching frequency of the power supply circuit from the frequency point 308 to the frequency point 310, which is still higher than the data modulation frequency band 302. Alternatively, the operating mode controller may decrease the switching frequency of the power supply circuit from the frequency point 308 to the frequency point 312, which is within the data modulation frequency band 302 or to the frequency point 314, which is lower than the data modulation frequency band 302. For example, at the frequency point 314, the power supply circuit has the highest power supply efficiency and the highest DSL QLN harmonic interference. At the frequency point 312, the power supply circuit has a power supply efficiency that is lower than the power supply efficiency of the power supply circuit at the frequency point 304. At the frequency point 306, the power supply circuit has a power supply efficiency that is lower than the power supply efficiency of the power supply circuit at the frequency point 312. At the frequency points 304, 312, and 314, the power supply circuit has varying degrees of harmonic contribution to DSL QLN. For example, the power supply circuit can have n (n is an integer that is 1 or larger than 1) times the harmonics that exist in the frequency band 302. In order to reduce harmonic interference in the DSL band, a higher in-band frequency is preferred over a lower frequency. In some embodiments, the frequency point 312 is selected as the highest possible frequency within the frequency band 302 that limits the in-band QLN harmonics. At the frequency point 306, the power supply circuit may only have a single harmonic, which is the fundamental switching frequency of DSL QLN interference or noise ingress. At the frequency point 310, the power supply circuit has a power supply efficiency that is higher than the power supply efficiency of the power supply circuit at the frequency point 308. Because the frequency points 308, 310 are outside of the frequency band 302, the power supply circuit experiences little to no DSL QLN interference at the frequency points 308, 310.

In an example, the power supply is an adaptive Point of Load (POL) power supply having an adaptable switching frequency of the power system, as disclosed herein. For example, the switching frequency may be adaptable in response to the switch of the power source from a power supply circuit or utility to a battery backup source. In the utility mode, a higher switching frequency, i.e., a switching frequency that is outside of the frequency band of the communications device (e.g., higher than 2.2 MHz in the above example), is used to minimize interference with performance levels of the line. In a battery mode, the POL power supply may switch operation to a lower switching frequency, such that the Buck regulators are operable at a lower battery voltage. The lower frequency is associated with lower Buck voltage headroom, increasing the efficiency of the Buck regulator in the battery mode.

Turning back to FIG. 2, the operating mode controller 104 may switch the power supply circuit 102 to operate in the low switching frequency operating mode 204 when the communications device 100 is in a training mode with a communications controller device. In some embodiments, the communications device is a DSL device and the operating mode controller switches the power supply circuit to operate in the low switching frequency operating mode when the DSL device is in a training mode with a DSL controller device, such as a DSLAM. In these embodiments, the power supply circuit is switched into the low switching frequency operating mode such that the corresponding DSL controller device (e.g., a DSLAM) does not select Discrete Multi-Tone (DMT) frequency bins as part of the trained communication bin assignments. By subjecting a DSL device (e.g., a DSL modem) to the potential noise at the lower frequency, the DSL bit loading at aggressor frequencies of the power supply circuit 102, e.g., a POL supply, and the switching regulator 112 is avoided for DSL communications. Thus, selecting a power supply operating mode during training may force exclusion of potential noise ingress frequencies while in a battery mode.

Figure 4:
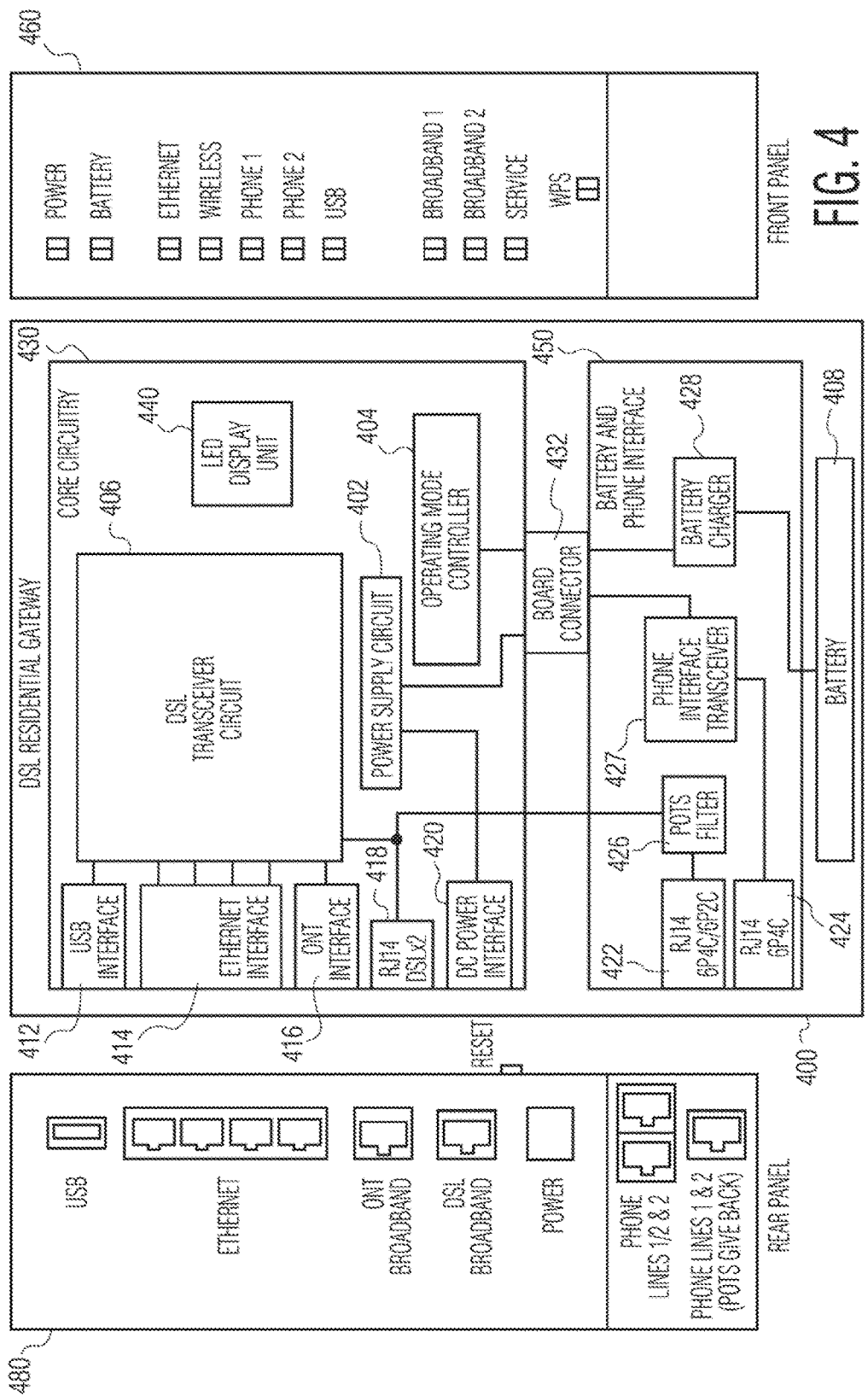
FIG. 4 depicts a schematic diagram of one embodiment of the communications device of FIG. 1.

FIG. 4 depicts a schematic diagram of one embodiment of the communications device 100 of FIG. 1. In the embodiment depicted in FIG. 4, a DSL residential gateway 400 includes core circuitry 430, a battery and phone interface 450 and a battery 408. The DSL residential gateway depicted in FIG. 4 is one possible embodiment of the communications device depicted in FIG. 1. However, the communications device depicted in FIG. 1 is not limited to the DSL residential gateway shown in FIG. 4.

The core circuitry 430 of the DSL residential gateway 400 includes a power supply circuit 402, an operating mode controller 404, a DSL transceiver circuit 406, a light-emitting diode (LED) display unit 440, a Universal Serial Bus (USB) interface 412, an Ethernet interface 414, an Optical Network Terminal (ONT) interface 416, a DSL broadband interface 418 (e.g., a RJ14DSLx2 interface), and a DC power interface 420. In some embodiments, the operating mode controller and the DSL transceiver circuit are integrated in the same System on Chip (SoC) device. In the embodiment depicted in FIG. 4, a front panel 460 shows LED lights for various signal statuses of the DSL residential gateway and a rear panel 480 of the DSL residential gateway includes corresponding USB, Ethernet interface, ONT, DSL broadband, and power sockets for the USB interface, the Ethernet interface, the ONT interface, the DSL broadband interface, and the DC power interface of the core circuitry. The power supply circuit, the operating mode controller, and the DSL transceiver circuit depicted in FIG. 4 may be similar to or the same as the power supply circuit 102, the operating mode controller 104, and the transceiver circuit 106 depicted in FIG. 1, respectively.

The battery and phone interface 450 of the DSL residential gateway 400 includes phone interfaces 422, 424, a plain old telephone service (POTS) filter 426, a Voice Over Internet Protocol (VOIP) Subscriber Line Interface Circuit (SLIC) phone interface transceiver 427, and a battery charger 428 that is connected to the power supply circuit 402 and to the operating mode controller 404 through a connector 432 (e.g., a board connector) for charging the battery 408 and controlling the VOIP phone ports. In the embodiment depicted in FIG. 4, the rear panel 480 of the DSL residential gateway includes corresponding phone sockets for the phone interfaces of the battery and phone interface.

Figure 5:
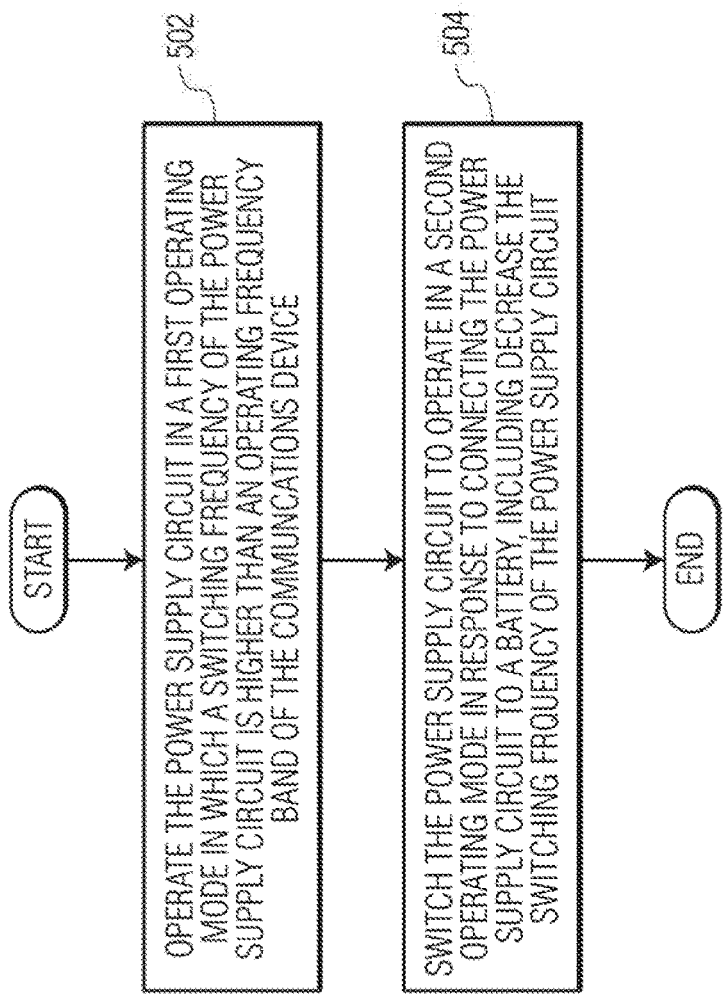
FIG. 5 depicts a flowchart diagram of an embodiment of a method for operating a power supply circuit of a communications device.

FIG. 5 depicts a flowchart diagram of an embodiment of a method for operating a power supply circuit of a communications device. The power supply circuit may be similar to or the same as the power supply circuit 102 depicted in FIG. 1 and/or the power supply circuit 402 depicted in FIG. 4. The communications device may be similar to or the same as the communications device 100 depicted in FIG. 1 and/or the DSL residential gateway 400 depicted in FIG. 4. At block 502, the power supply circuit is operated in a first operating mode in which a switching frequency of the power supply circuit is higher than an operating frequency band of the communications device. At block 504, the power supply circuit is switched to operate in a second operating mode in response to connecting the power supply circuit to a battery and the switching frequency of the power supply circuit is decreased.

In the above description, specific details of various embodiments are provided. However, some embodiments may be practiced with less than all of these specific details. In other instances, certain methods, procedures, components, structures, and/or functions are described in no more detail than to enable the various embodiments disclosed, for the sake of brevity and clarity.

The flowchart and block diagrams in the figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments disclosed herein have been described and illustrated, this disclosure is not to be limited to the specific forms or arrangements of parts so described and illustrated. The scope of the claims appended hereto may cover one or more embodiments described herein and their equivalents.

What is claimed is:

1. A method for operating a power supply circuit of a communications device, the method comprising:
   operating the power supply circuit in a first operating mode in which a switching frequency of the power supply circuit is higher than an operating frequency band of the communications device; and
   switching the power supply circuit to operate in a second operating mode in response to connecting the power supply circuit to a battery, wherein switching the power supply circuit to operate in the second operating mode comprises decreasing the switching frequency of the power supply circuit,
   wherein the operating frequency band of the communications device comprises a data modulation frequency band of the communications device, and
   wherein decreasing the switching frequency of the power supply circuit comprises decreasing the switching frequency of the power supply circuit to be within or lower than the data modulation frequency band of the communications device.

2. The method of claim 1, wherein the data modulation frequency band of the communications device is between 0.14 megahertz (MHz) and 2.2 MHz.

3. The method of claim 1, wherein the power supply circuit comprises a switched mode power supply circuit, and wherein the communications device comprises a digital subscriber line (DSL) device.

4. The method of claim 1, wherein operating the power supply circuit in the first operating mode comprises operating the power supply circuit in the first operating mode in response to connecting the power supply circuit to a power outlet.

5. The method of claim 1, wherein switching the power supply circuit to operate in the second operating mode in response to connecting the power supply circuit to the battery comprises switching the power supply circuit to operate in the second operating mode when a voltage of the battery is below a threshold voltage.

6. The method of claim 5, wherein decreasing the switching frequency of the power supply circuit comprises decreasing the switching frequency of the power supply circuit to be within or lower than the operating frequency band of the communications device.

7. The method of claim 1, further comprising switching the power supply circuit to operate in the second operating mode in response to the communications device being in a training mode with a communications controller device.

8. The method of claim 7, wherein the communications controller device comprises a digital subscriber line access multiplexer (DSLAM).

9. A system for operating a power supply circuit of a communications device, the system comprising:
an operating mode controller configured to:
operate the power supply circuit in a first operating mode in which a switching frequency of the power supply circuit is higher than an operating frequency band of the communications device; and
switch the power supply circuit to operate in a second operating mode in response to connecting the power supply circuit to a battery by decreasing the switching frequency of the power supply circuit,
wherein the operating mode controller is further configured to decrease the switching frequency of the power supply circuit to be within or lower than the data modulation frequency band of the communications device.

10. The communications device of claim 9, wherein the communications device comprises:
a transceiver circuit;
the power supply circuit the battery; and
the operating mode controller.

11. The system of claim 9, wherein the operating frequency band of the communications device comprises a data modulation frequency band of the communications device.

12. The system of claim 9, wherein the power supply circuit comprises a switched mode power supply circuit, and wherein the communications device comprises a digital subscriber line (DSL) device.

13. The system of claim 9, wherein the operating mode controller is further configured to operate the power supply circuit in the first operating mode in response to connecting the power supply circuit to a power outlet.

14. The system of claim 9, wherein the operating mode controller is further configured to switch the power supply circuit to operate in the second operating mode when a voltage of the battery is below a threshold voltage.

15. The system of claim 13, wherein the operating mode controller is further configured to decrease the switching frequency of the power supply circuit to be within or lower than the operating frequency band of the communications device.

16. A method for operating a power supply circuit for a digital subscriber line (DSL) device, the method comprising:
operating the power supply circuit in a first operating mode in which a switching frequency of the power supply circuit is higher than a data modulation frequency band of the DSL device; and
switching the power supply circuit to operate in a second operating mode in response to connecting the power supply circuit to a battery or in response to the DSL device being in a training mode with a DSL controller device, wherein switching the power supply circuit to operate in the second operating mode comprises decreasing the switching frequency of the power supply circuit to be within or lower than the data modulation frequency band of the DSL device.

* * * * *